US009223607B2

(12) United States Patent
Kar et al.

(10) Patent No.: US 9,223,607 B2
(45) Date of Patent: Dec. 29, 2015

(54) SYSTEM FOR REPLICATING OR MIGRATING VIRTUAL MACHINE OPERATIONS LOG BY THROTTLING GUEST WRITE IOS BASED ON DESTINATION THROUGHPUT

(75) Inventors: Palash Kar, Hyderabad (IN); Dustin Lyle Green, Redmond, WA (US); Sriravi Kotagiri, Hyderabad (IN); Rahul Shrikant Newaskar, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 13/351,487

(22) Filed: Jan. 17, 2012

(65) Prior Publication Data
US 2013/0185719 A1 Jul. 18, 2013

(51) Int. Cl.
*G06F 9/455* (2006.01)
*G11B 19/28* (2006.01)

(52) U.S. Cl.
CPC ............ *G06F 9/45558* (2013.01); *G11B 19/28* (2013.01); *G06F 2009/45579* (2013.01); *G06F 2211/1019* (2013.01)

(58) Field of Classification Search
CPC . G06F 9/455; G06F 2211/1019; G11B 19/24; G11B 19/28; G11B 27/105; G11B 27/19; G11B 27/136
USPC ............ 718/1; 386/222; 360/69, 73.01, 73.02
See application file for complete search history.

(56) References Cited

U.S. PATENT DOCUMENTS

| 7,174,379 | B2* | 2/2007 | Agarwal et al. ............... 709/226 |
| 7,203,944 | B1 | 4/2007 | van Rietschote et al. |
| 7,890,461 | B2* | 2/2011 | Oeda et al. .................... 707/614 |
| 7,900,005 | B2 | 3/2011 | Kotsovinos et al. |
| 8,359,593 | B2* | 1/2013 | Golosovker et al. .............. 718/1 |
| 8,380,669 | B2* | 2/2013 | Groethe et al. ............... 707/637 |
| 8,458,284 | B2* | 6/2013 | Huang et al. .................. 709/213 |
| 8,504,686 | B2* | 8/2013 | Phaal ............................ 709/224 |
| 8,656,388 | B2* | 2/2014 | Chou et al. ........................ 718/1 |
| 8,782,235 | B2* | 7/2014 | Nishiguchi et al. ........... 709/226 |

(Continued)

OTHER PUBLICATIONS

Mashtizadeh etal, The design and evolution of live storage migration in VMware ESX, Jun. 2011, USENIX ATC'11, Proceedings of the 2011 USENIX conference on USENIX annual technical conference, pp. 1-14.*

(Continued)

*Primary Examiner* — Meng An
*Assistant Examiner* — Abu Ghaffari
(74) *Attorney, Agent, or Firm* — Sunah Lee; Judy Yee; Micky Minhas

(57) ABSTRACT

This application describes a system and techniques for managing the replication, migration, or backing up of virtual machines (VM) operating on a computing device. The techniques include managing real time or near real replication or migration of VM operations logs between computing devices. The operations logs include information or data that would enable another VM to function or operate in the same manner as the VM that generated the operations logs. Techniques are presented herein to insure the replication or migration process of VMs is not open ended or indefinite. For example, the write rate of the source operations log is managed to insure the replication or migration of the source operations log to destination device terminates within a reasonable amount of time.

17 Claims, 5 Drawing Sheets

(56) References Cited

U.S. PATENT DOCUMENTS

| | | | |
|---|---|---|---|
| 2003/0014568 A1* | 1/2003 | Kishi et al. | 710/4 |
| 2003/0047057 A1* | 3/2003 | Sasaki | 84/1 |
| 2010/0070725 A1* | 3/2010 | Prahlad et al. | 711/162 |
| 2010/0138840 A1* | 6/2010 | Kagan et al. | 718/104 |
| 2010/0241726 A1 | 9/2010 | Wu | |
| 2010/0268816 A1* | 10/2010 | Tarui et al. | 709/224 |
| 2010/0318991 A1* | 12/2010 | Venkitachalam et al. | 718/1 |
| 2011/0004935 A1* | 1/2011 | Moffie et al. | 726/23 |
| 2011/0116185 A1* | 5/2011 | Katagiri et al. | 360/73.04 |
| 2011/0145471 A1* | 6/2011 | Corry et al. | 711/6 |
| 2011/0197039 A1* | 8/2011 | Green et al. | 711/162 |
| 2012/0023493 A1* | 1/2012 | Mori | 718/1 |
| 2012/0174102 A1* | 7/2012 | Kagan et al. | 718/1 |

OTHER PUBLICATIONS

Bradford etal, Live Wide-Area Migration of Virtual Machines Including Local Persistent State, Jun. 2007, ACM, Proceedings of the 3rd international conference on Virtual execution environments, pp. 169-179.*

Bradford et al., "Live Wide-Area Migration of Virtual Machines Including Local Persistent State," Proceedings: 3rd international conference on Virtual execution environments, Jun. 13-15, 2007, retrieved at <<http://citeseer.ist.psu.edu/viewdoc/download;jsessionid=6F9BB30ACDE13D88192437A8DBFCD035?doi=10.1.1.62.5640&rep=rep1&type=pdf>>, pp. 169-179.

Mashtizadeh et al., "The Design and Evolution of Live Storage Migration in VMware ESX," Jun. 2011, retrieved at <<http://www.usenix.org/events/atc11/tech/final_files/Mashtizadeh.pdf, pp. 1-14.

Zheng et al., "Workload-Aware Live Storage Migration for Clouds," Proceedings: 7th ACM SIGPLAN/SIGOPS international conference on Virtual execution environments, Mar. 9-11, 2011, retrieved at <<http://www.cs.rice.edu/~eugeneng/papers/VEE11.pdf>>, 12 pages.

\* cited by examiner

SYSTEM FOR REPLICATING OR MIGRATING VIRTUAL MACHINE OPERATIONS LOG BY THROTTLING GUEST WRITE IOS BASED ON DESTINATION THROUGHPUT

BACKGROUND

A virtual machine (VM) is a software implementation on a computer system that emulates the functionality of a physical or host computer. VM's can operate within a virtualization layer that runs on top of a client or server operating system. The host computer can operate multiple VM's that function independently of each other and can run their own operating system or programs. Although the VM and host share common hardware resources the VM operates as its own computer with a virtual processor and memory that enable the VM to function as a separate computer system. The host computer can be configured to share resources between multiple VMs to enable concurrent operations of multiple VMs.

VMs can be replicated or migrated between multiple host computers or servers to optimize hardware utilization or for backups, disaster recovery, and network maintenance. VM configuration and operations logs can be replicated or migrated in their entirety or in real time or near real time to facilitate the seamless replication or migration between host computers. However, VM replication or migration can become open ended and not terminate within a reasonable time if not properly managed.

SUMMARY

This Summary is provided to introduce the simplified concepts for managing the replication or migration of virtual machines (VMs) between one or more host computers. The application describes techniques that control the write rates between one or more host computers for a VM that is being migrated or replicated between the host computers.

A first VM operating on a first host computer can be migrated or replicated to a second host computer. The migration or replication process occurs by transferring the configuration and operations log of the first VM on the second host computer. Following the configuration of a second VM on the second host computer, the second VM begins operating or mirroring the operations of the first VM based on the content in the transferred operations log. Accordingly, the migration of the first VM to the second VM is limited by how fast the operations log is being written on the second host computer. For example, if the write rate of the first VM operations log is much greater than the write rate of the second VM operations log, the migration or replication process could never be completed. The write rate being based in part on a total number of bytes being stored in memory over a predetermined time interval. The write rate can be dictated by several factors such as host computer resources, VM utilization, VM processor capability, and VM memory capability.

Driving the replication or migration process to completion can be accomplished by monitoring and managing the write rates of the operations logs to their respective memories of the first and second VMs. For instance, the second host or second VM can send the write rate of the second VM operations log to the first host for comparison with the write rate of the first VM operations log. In one embodiment, if the first VM write rate is greater than the second VM write rate, the first VM can decrease the first VM write rate until it is less than or equal to the second VM write rate. In another embodiment, the second VM write rate is paired with a destination coefficient value to create a destination write rate for the second VM. The destination write rate is compared against the first VM write rate. If the destination write rate is less than the first VM write rate, the first VM reduces its write rate below a calculated threshold value. In one embodiment, the calculated threshold value is based upon the second VM write rate and a source write slowdown control value or slowdown coefficient.

The migration process can also occur at predefined intervals. For example, the first VM operations log can be sent to the second host computer at predetermined intervals. The write rate of the operations log at the second VM is sent back to the first host and compared against the predetermined time interval. If the second VM write rate is not fast enough to write all the information to memory during the predetermined time interval, the first VM is directed to slow down the write rate of the operations log of the first VM. In short, the technique described above limits the migration speed or size of the operations log being sent to the second VM if the second VM is unable to store all of the portions of the received operations log within the predetermined time interval.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes, in part, systems and techniques for migrating or replicating virtual machines between two host computers. To do so, the system may utilize multiple different techniques to migrate and replicate virtual machines. The techniques described above and below may be implemented in a number of ways and contexts. Several example implementations and contexts are provided with reference to the following figures, as described in more detail below. However, the following implementations and contexts are but a few of many.

Example Environment & Method

Figure 1:
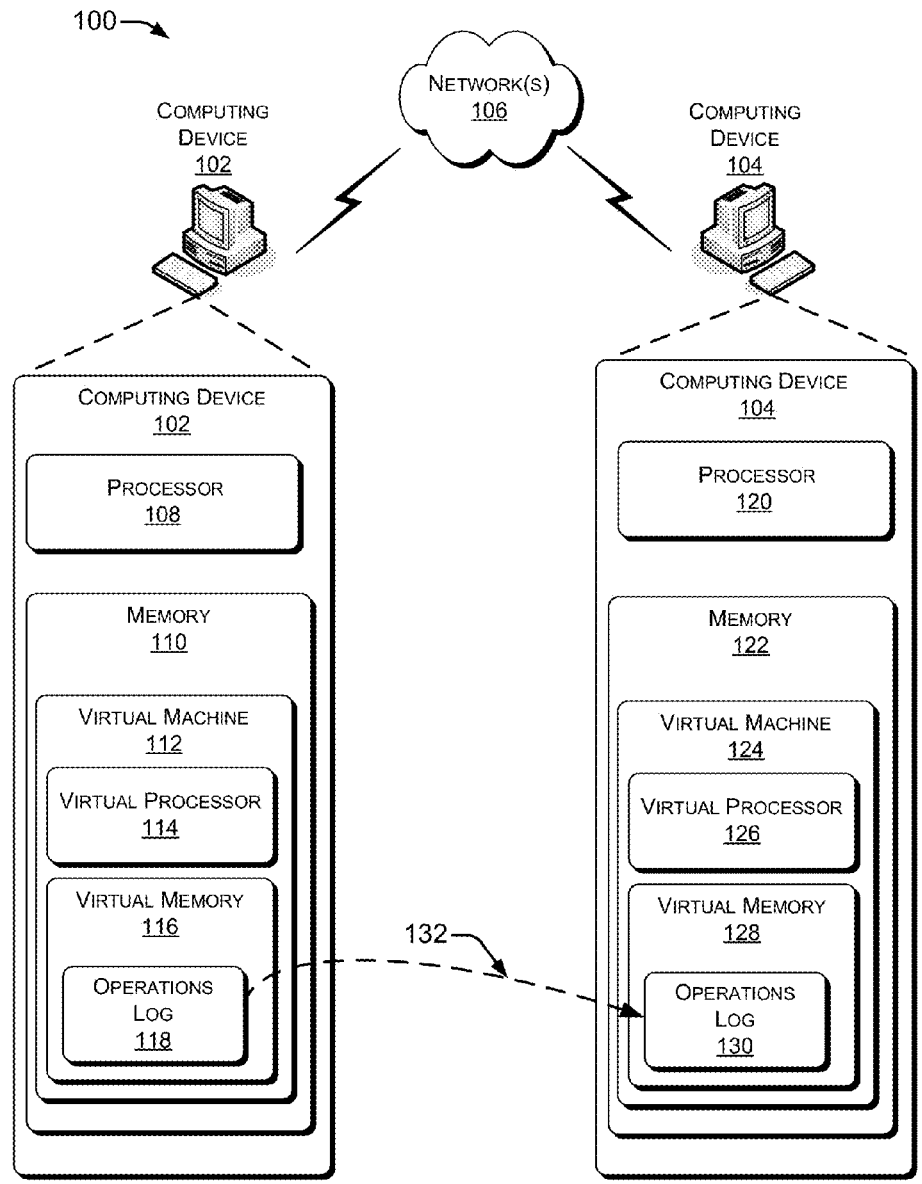
FIG. 1 illustrates an example environment of a virtual machine being migrated or replicated between two host computers.

FIG. 1 illustrates an example environment 100 that includes a first computing device 102 and a second computing device 104 coupled together over a network 106. The first computing device includes a processor 108 and a memory 110. The second computing device also includes a processor 120 and memory 122. The network 106 is representative of any network that can include a local area network within a company or a wide area network such as the internet or world wide web.

Within the memory 110 of the first computing device 102, a virtual machine (VM) 112 can be configured to operate as a stand alone entity that utilizes the hardware of the first computing device 102. The VM 112 functions as a self-contained operating environment that acts as if it is a separate computer. In that regard, the VM 112 includes a virtual processor 114 and a virtual memory 116 that enable the VM 112 to function as a separate computer distinct from the computing device 102. As shown in FIG. 1, the components of the VM 112 reside in the memory 110 of the first computing device 102.

The first VM 112 generates an operations log 118 that captures information that would enable a second VM 124 to replicate or operate in a similar manner as or in conjunction with the first VM 112. This capability enables the first VM 112 to be replicated or migrated to a second computing device 104. In one instance, the replication process can be implemented while running the first VM 112 on a first computing device 102 without affecting the performance of the first VM 112. The first operations log 118 is replicated in a second computing device 104 and is used to operate a second VM 124 using another virtual processor 126 and virtual memory 128. The second operations log 130 enables the second VM 124 to mirror the performance of the first VM 112 such that the second VM 130 can operate as a backup to the first VM 112. For example, if the first VM 112 or the first computing device 102 experiences a failure, the second VM 130 could continue the operations being performed by the first VM 112 with minimal delay until the first VM 112 could be recovered.

In alternative embodiment, the operations log 118 resides in the local memory 110 and is exclusive from the virtual memory 116. In short, the operations log is not required to be assigned to the virtual memory 116 of the virtual machine 112. The operations log 118 should be accessible by the virtual machine 112, as in the virtual machine 112 should be able to read and write to the operations log 118 where ever it is located.

The replication of the operations log 118 as represented by arrow 132, from computing device 102 to computing device 104 includes several factors that need to be considered during the replications process. The factors can include the write rate of the operations log 118 or the source write rate and the write rate of the second operations log 130 or the destination write rate. The destination write rate is determined by the total number of bytes written at the destination or the second operations log 130 within a particular time interval. Another way of computing the destination write rate is to compute the total bytes of data written to the source operations log 130 from a designated start time. The same techniques are used to determine the source write rate or the write rate of the first operations log 118. By using the same time interval to calculate the two write rates it will be possible to account for the delay of sending date from the first computing device 102 over the network 106 to the second computing device 104. However, in alternative embodiments, using the same time interval to determine the write rates is not required. For instance, the write rates for each log may be completed at different times and different durations. Any technique at any time interval can indicate how fast each log is being generated can be used to determine the source and destination write rates.

In one embodiment, data can be sent from the first computing device 102 to the second computing device 104 continuously in real time or near real time. Accordingly, the write rate for each operations log 118, 130 can be calculated continuously over predetermined time intervals to provide continuous management of the replication process. Alternatively, the operations log 118 data can be sent at predetermined time intervals. For example, the replication data can be sent to the second operations log 130 after a period of time has elapsed. Hence, the transfer of replication data does not have to be continuous but can be parsed into discrete portions. In one embodiment, the first operations log 118 data is sent to the second computing device 104 every five minutes. Accordingly, the write rates for each operations log can be compared once the writing of the second operations log 130 has started.

Figure 2:
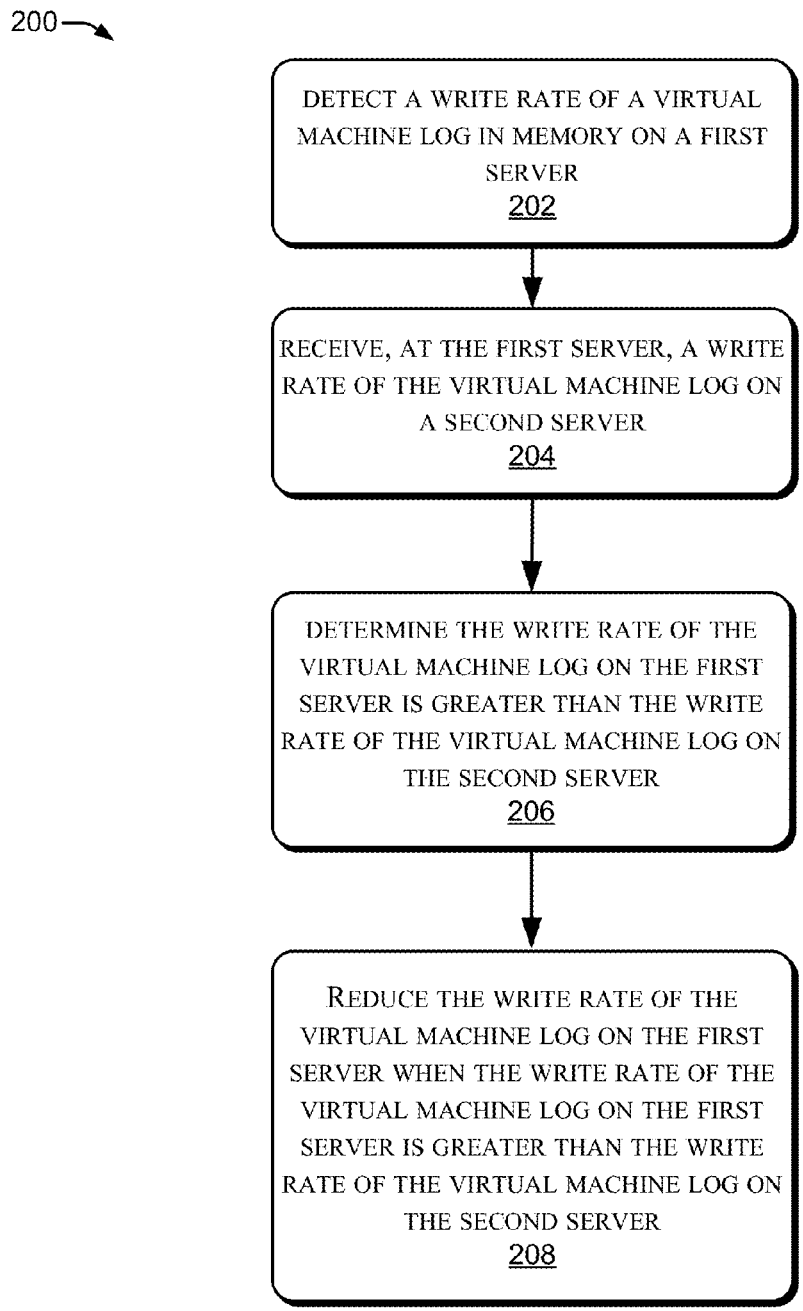
FIG. 2 illustrates an exemplary method of employing throttling for migrating or replicating a virtual machine between two host computers.

FIG. 2 illustrates a process flow diagram 200 that describes a method or process for managing the replication or migration of a VM 112 operations log 118 from a first computing device 102 to a second computing device 104.

At 202, each computing device 102, 104 detects the write rates for each corresponding operations log 118, 130. The write rates are computed based in part on a total number of bytes being stored in memory over a predetermined time interval. For example, if the predetermined time interval was one minute and the amount of data stored in memory was 1 MB. The write rate would be 1 MB/min. In one embodiment, the first processor 114 determines that the operations log 118 of the first VM 112 saves data at 1 MB/min and saves that result in memory 116. Similarly, the second processor 126 determines that the operations log 130 of the second VM 124 saves data 0.8 MB/min and saves the result in memory 128. In this embodiment, the predetermined time interval used to calculate the write rates are concurrent with each other. For example, the start time and end time are the same for each calculation. However, in alternative embodiments, the write rates may use different time intervals to determine the write rate for each VM. For instance, the start and end times of the predetermined intervals for each calculation may be different and may be of different durations. For example, the write rate sampling start and end times may overlap in some manner, but are not exactly starting and ending at the same time.

At 204, the second computing device 104 or server sends the write rate of the second operations log 130 to the first computing device 102. The write rate data from the second operations log 130 is sent over the network 106. However, in other embodiments, the second operations log 130 may be located within the computing device 102 and is used to operate a second VM on the first computing device 102 instead of the second computing device 104.

At 206, the first computing device 102 or the VM 112 compares the write rates using the processor 144 or other logic implemented by the computing device 102 to determine if the first write rate or the source write rate of the first operations log 118 is greater than the second write rate or the destination write rate of second operations log 130. This comparison is represented by equation (1).

$$\text{Source Write Rate} > \text{Destination Write Rate} \quad (1)$$

In another embodiment, a destination coefficient is applied to the destination write rate prior to the comparison to the source write rate. The destination coefficient is a threshold value used to insure that that source write rate does not exceed the destination write by a suitable margin to account for device 102, 104 or network 106 abnormalities or transient events that may delay or hinder the delay the writing of data to the destination operations log 130. In short, the destination coefficient raises the destination write rate by a suitable margin to minimize transient events that may slow the transfer of data from the source operations log 118 and the destination operations log 130. This application of the destination coefficient to the destination write rate is represented by equation (2).

$$\text{Source Write Rate} > \text{Destination Write Rate} * \text{Destination Coefficient} \quad (2)$$

At 208, if the source write rate is greater than the destination write rate, the computing device 102 or VM 112 reduces the source write rate. In one embodiment, the source write rate is lowered until it is less than or equal to the destination write rate. In another embodiment, the source write rate is lowered until it is less than a value based in part on the destination write rate and a slowdown coefficient. In one particular embodiment, the slowdown coefficient is a value less than the destination coefficient and is used to make the destination write rate to appear lower to create a threshold that can account for transient events in the devices 102, 104 or the network 106. The relationship between the source write rate, the destination write rate, and the slowdown coefficient is represented by equation (3).

$$\text{Source Write Rate} < \text{Destination Write Rate} * \text{Slow Down Coefficient} \quad (3)$$

In an alternative embodiment, the destination coefficient is set based on a long term average of the source write rate that can account with variances in the operational speed of the source VM and in the network. For example, the long term average could be based on VMs that have performed similar functions in the past or may be based on a group average of VMs operating on the system.

Figure 3:
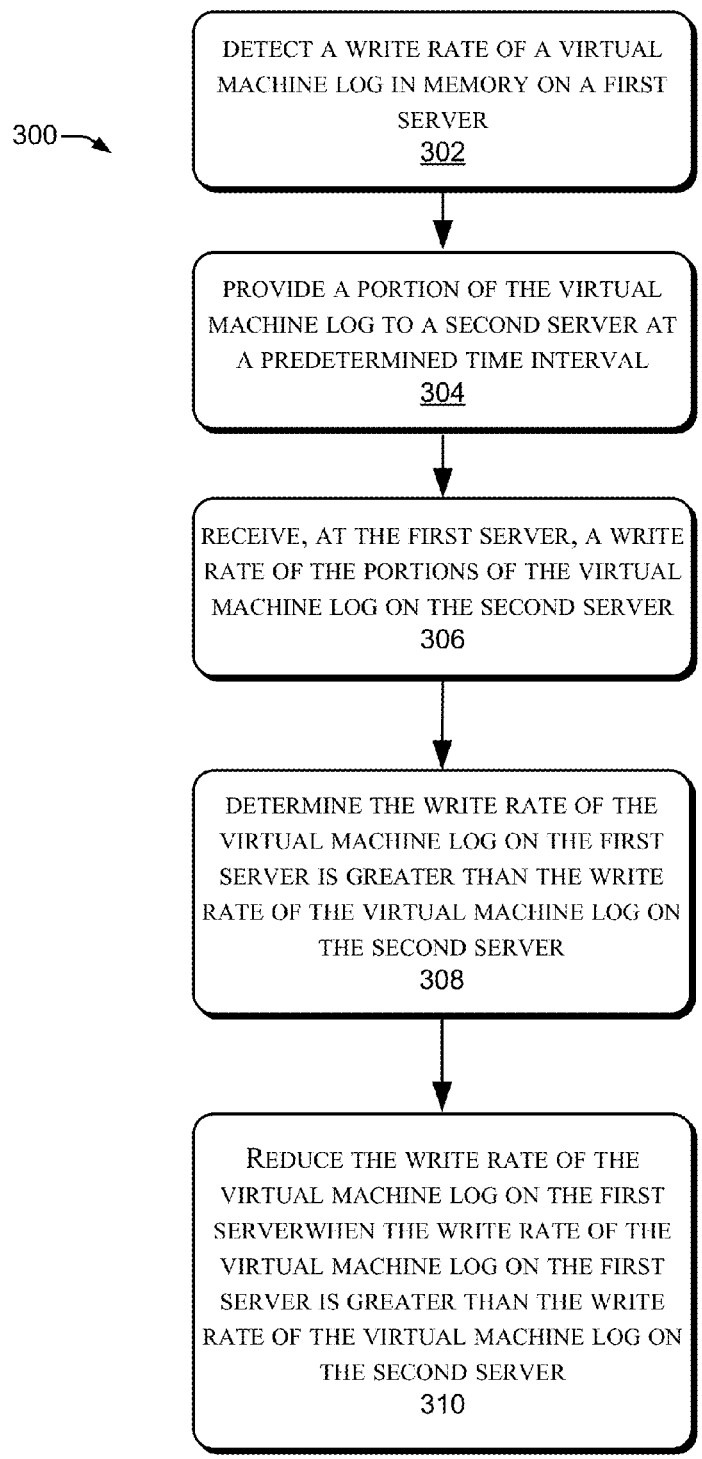
FIG. 3 illustrates another exemplary method of employing throttling for migrating or replicating a virtual machine between two host computers.

FIG. 3 illustrates another process flow diagram 300 that describes controlling the replication of an operations log 118 in discrete portions during predetermined time intervals. For example, portions of the operations log 118 are sent to the second computing device every five minutes. The portions include data that has been generated during the previous five minutes. In short, the second operations log 130 is updated with additional information from the first operations log 118 every five minutes.

At 302, the first computing device 102 or the VM 112 detects a write rate of the source operations log 118 that records the operations performed by the VM 112. The write rates are computed based in part on a total number of bytes being stored in memory over a predetermined time interval. For example, if the predetermined time interval was one minute and the amount of data stored in memory was 1 MB. The write rate would be 1 MB/min.

At 304, the computing device 102 or the VM 112 provides a portion of the source operations log 118 to the second computing device 104 to be saved by the second or destination VM 124 in the destination operations log 130. The portion represents a sample of the source operations log 118 that is collected during a predetermined time interval. In this embodiment, the replication process is based on a fixed frequency that enables a routine backup for the first VM 112 to support a slow recovery of the VM 112 if it fails to function as intended. In concept, the second or destination VM 124 would be able to recover from where the first or source VM 112 failed based on the most recent backup. In this embodiment, the fixed frequency is dependent on the operational conditions of the source VM 112 as set by an administrator. The backup frequency could set in terms of second, minutes, or hours. For example, if 5 MB of data is written into first operations log while the replication interval is every five minutes, the first write rate or source write rate would be 1 MB/min. The first or source write rate is determined by equation (4).

$$\text{Source Write Rate} = (\text{amount of data generated during the replication interval})/(\text{replication frequency}) \quad (4)$$

At 306, the first computing device 102 or the source VM 112 receives a destination write rate from the second computing device 104 or the destination VM 124. In this embodiment, the destination write rate for the second operations log 130 is based on the amount of data generated during the replication frequency interval and the amount of time to send the data from the first VM 112 and applied to the second operations log 130. For example, if the 5 MB takes 25 minutes to send from the first computing device 102 and have it applied to the second or destination operations log 130, the destination write rate would be 2 MB/min. The second write rate or destination write rate is represented by equation (5).

$$\text{Destination Write Rate} = (\text{amount of data generated during the replication interval})/(\text{transfer time}) \quad (5)$$

At 308, the computing device 102 or the source VM 112 compares the destination write rate and the source write rate.

At 310, if the source write rate is greater than the destination write rate the source VM 112 reduces the source write rate. In one embodiment, the source write rate is reduced until the source write rate is less than the destination write rate. In another embodiment, the source write rate is reduced to an amount that is below the destination write rate. The amount being set by the administrator of the VMs 112, 124.

In an alternative embodiment, the throttling of the source and destination write rates can be enabled by monitoring the buffer size of the destination VM operations log 130 and throttling the write rate of source operations log 118 if the buffer exceeds a predetermined amount. The buffer (not shown) contains the queue of information waiting to be written in the destination operations log 130. If the size of the buffer exceeds a predetermined amount, a message is provided to the source VM 112 to slow or stop the source write rate until the buffer size is below the predetermined amount. Alternatively, a message to slow the source write rate is provided to the source VM 112 as the destination buffer size approaches the predetermined amount. In this implementation, the source write rate is reduced to an amount that prevents the buffer size from exceeding the predetermined amount.

Figure 4:
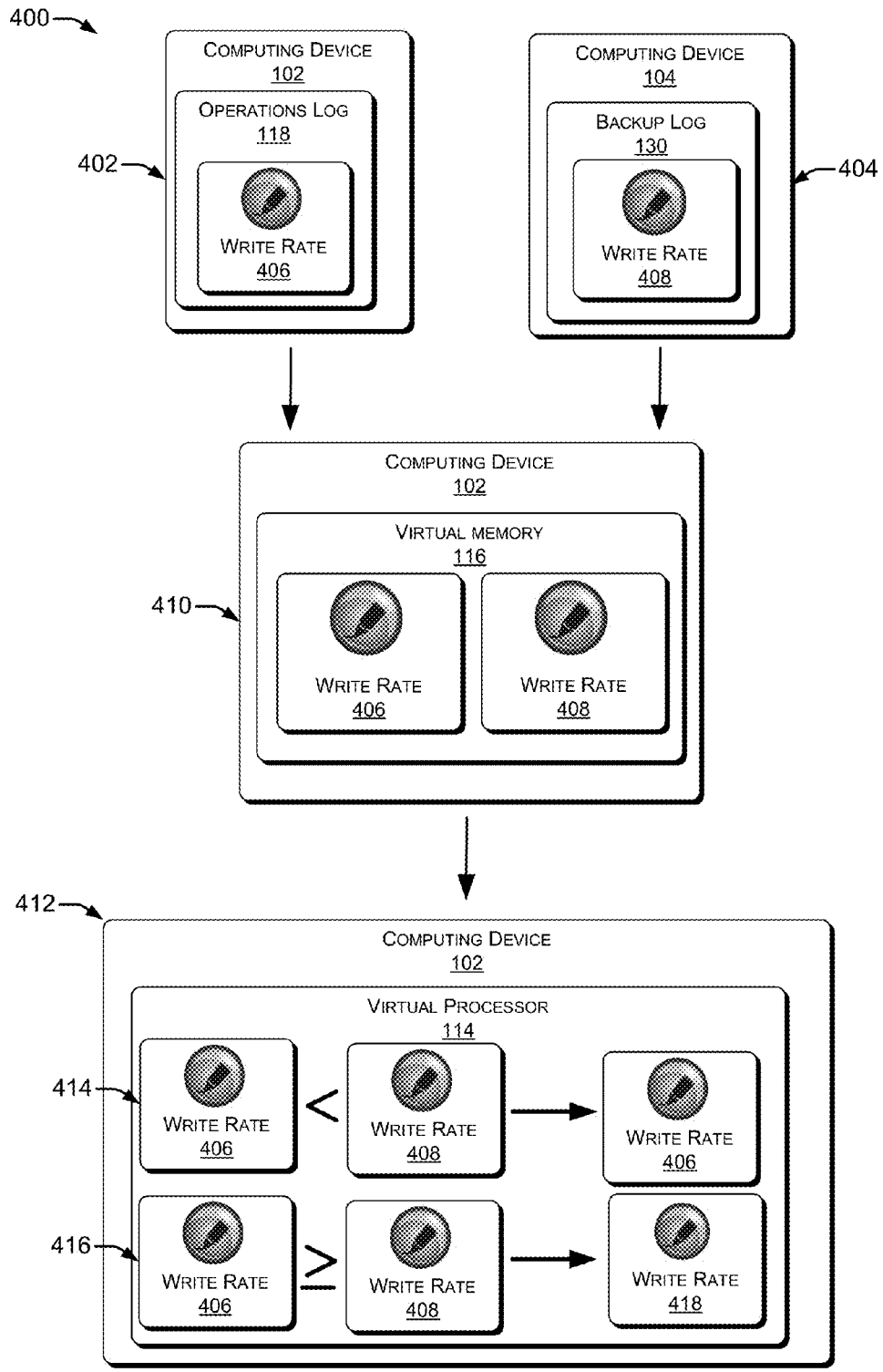
FIG. 4 illustrates a diagram representative of a method of employing throttling for migrating or replicating a virtual machine between two host computers.

FIG. 4 is an illustration of a set of diagrams 400 that are representative of a method for migrating or replicating a virtual machine operations log 118 between two host computers 102, 104.

Diagram 402 illustrates the computing device 102 that is the source in the replication process described above in FIGS. 2 and 3. The source operations log 118 is for the source VM 112 (not shown in this figure) and it records the functions performed or monitored by the source VM 112. The computing device 102 or the source VM 112 detects the source write rate 406 of the operations log 118. The source write rate 406 can be determined by monitoring the amount of data saved in the log over a period of time. For example, the log could be saving 5 MB of data over a 5 minute time period. Hence, the source write rate would be 1 MB/min. The data being saved in the source operations log 118 is sent to the destination operations log or back up log 130 in computing device 104 for the backup VM 124 (not shown in the figure). The back up VM 124 or destination VM 124 is used to back up the source VM 112 if it fails to operate as intended or if the administrator determines to transfer the operations performed to another device 104 so that maintenance can be performed on the computing device 102.

Diagram 404 illustrates the computing device 104 that is the destination in the replication process described above in FIGS. 2 and 3. The destination or back up operations log 130 is for the destination VM 124 (not shown in this figure) and is a replica of the operations log 118. The computing device 104 or the destination VM 124 detects the destination write rate 408 of the back up operations log 130. The destination write rate 408 can be determined by monitoring the amount of data saved in the log over a period of time. For example, the log could be saving 5 MB of data over a 2.5 minute time period. Hence, the destination write rate 408 would be 2 MB/min.

Following the determination of the write rates 406, 408, they are sent and stored in the computing device 102. The destination write rate 408 being sent from the destination computing device 104 to the source computing device 102. Diagram 410 shows the source write rate 406 and the destination write rate 408 being saved in the virtual memory 116.

Diagram 412 illustrates the comparison of the source write rate 406 and the destination 408 by the virtual processor 114. In one embodiment 414, the source write rate 406 is less than the destination write rate 408. Under this condition, the source write rate 406 is not modified by the processor 114. In another embodiment 416, the source write rate 406 is greater than or equal to the destination write rate 408. Under this condition, the source write 408 is lowered to a new source write rate 418. The new source write rate 418 can be less than the destination write rate 408. The new source write rate 418 can also be determined using the techniques described in FIGS. 2 and 3.

Figure 5:
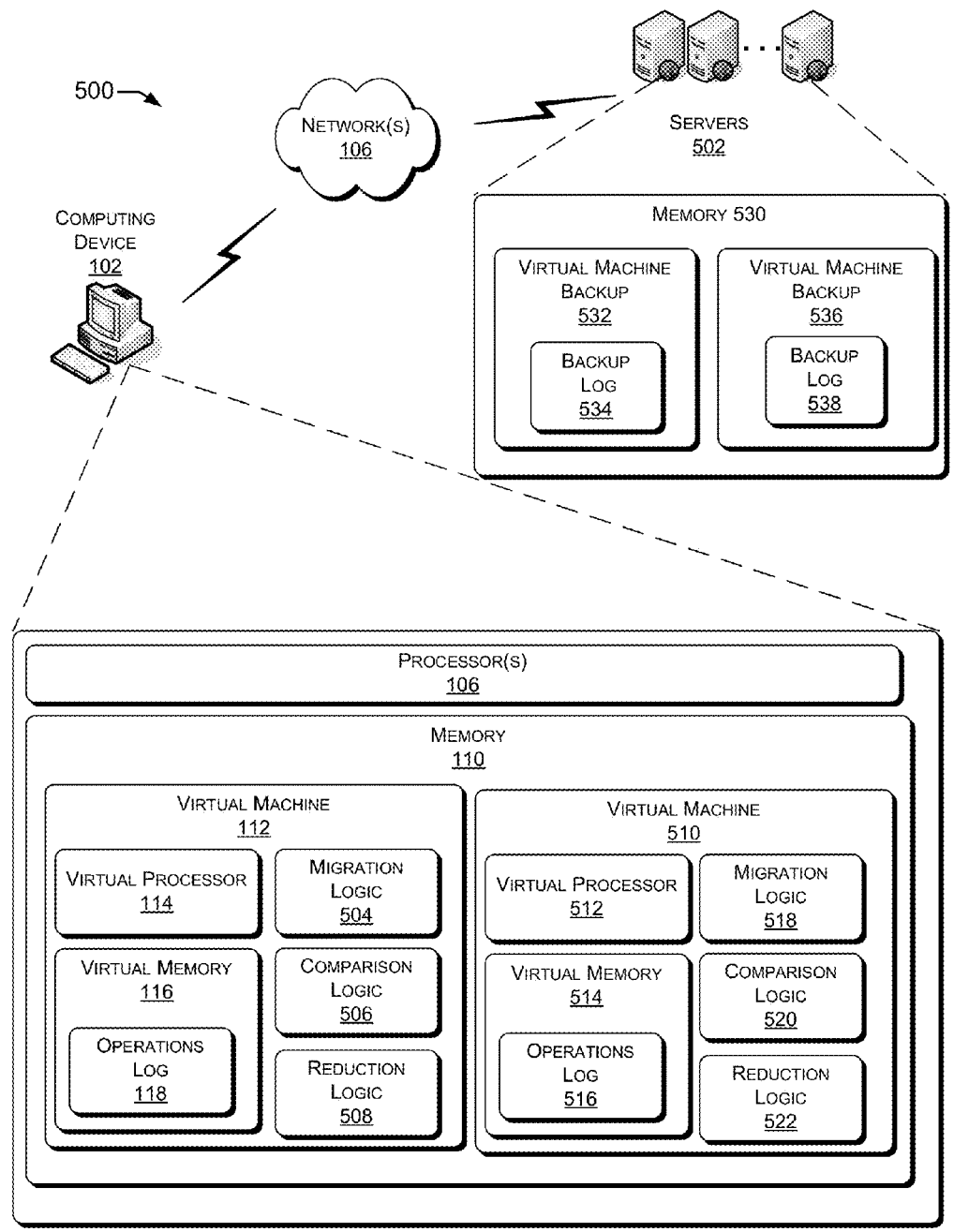
FIG. 5 illustrates another example environment of virtual machines being migrated or replicated between two or more host computers.

FIG. 5 illustrates another example environment 500 of virtual machines being migrated or replicated between two host computers. One of the host systems being computing device 102 as described above and the second host computer being a collection of servers 502. The two systems are coupled together via the network 106.

In this embodiment, the virtual machine environment includes two VMs 112, 510 operating within the memory 110 of computing device 102. The VMs 112, 510 each include migration components 504, 518, comparison components 506, 520, and reduction components 508, 522. In this embodiment, the aforementioned components are instructions stored in computer storage media that when executed by their respective processors 114, 512 perform operations that will be described below. Computer-readable storage media includes volatile and non-volatile, removable and non-removable media implemented in any method or technology for storage information such as computer readable instructions, data structures, program modules, program components, or other data. Computer-readable storage media includes, but is not limited to, RAM, ROM, EEPROM, flash memory, or other memory technology, CD-ROM, digital versatile disks (DVD), other optical storage technology, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as carrier waves, or other transmission mechanisms. As defined herein, computer storage media does not include communication media.

In other embodiments, the components (504, 506, 508, 518, 520, and 522) can be implemented as a combination of instructions and hardware logic. Alternatively, the components can also be implemented solely as hardware logic using programmable logic devices.

The migration components 504, 518 will direct where the source operations logs 118, 516 are sent for replication, migration, or backing up. The migration component will select one or more of the servers 502 and which portions of the memory 530 will receive the source operations log data. In this embodiment, the migration component would direct the data from source operations log 118 to destination operations log 534 for VM 532 and the data from source operations log 516 to destination operations log 538 for VM 536. The VM 112 being backed up by VM 532 and VM 510 being backed up by VM 536. In another embodiment, a single migration component will direct data for the two or more VMs being operated on the computing device 102.

When the migration process is selected to be performed for an existing VM, the process deals with the existing or background source operations log that existed prior to the start of the migration and the current writes that are being made to the source operations log in real time or near real time. In addition to throttling the source operations log write rate 406 during real time or near real time migration, the write rate 406 can be throttled when migrating or copying the portion of the source operations log that was created prior to the start of migration. In short, the source operations log 118 that existed prior to the start of migration is zeroed out. However, if the current write rate of the operations log is fast enough to out pace the zeroing out of the historical data, the migration component 504 can reduce the current write rate 406 of the source operations log 118 until the zeroing out process is completed. After the zeroing out process has been completed, the migration component 504 will direct the migration of the real time or near real time source write rate 406 of the source operations log 118 as described above.

The comparison components 506, 520 will compare the write rates (e.g., 406, 408) from the source operations logs 118, 516 and the destination operations logs 534, 536. The comparison component will also apply the destination coefficient and slow down coefficients to the write rates, as described above in FIGS. 2 and 3. For instance, the comparison component will use the slow coefficient to determine how much the source operations logs 118, 516 need to be decreased.

The reduction components 508, 522 will receive the results of the comparison performed by the comparison components 506, 520 and direct the VMs 112 and 510 to decrease the write rates for their respective source operations logs 118, 516. For example, when the comparison component determines that the source write rate 406 is greater than the destination write rate 408 the comparison component 506 determines how much the write rate should be decreased using equation (3) described above and this value is supplied to the reduction component 508 that directs the VM 112 to limit the write rate 406 accordingly.

CONCLUSION

Although the embodiments have been described in language specific to structural features and/or methodological acts, is the claims are not necessarily limited to the specific features or acts described. Rather, the specific features and acts are disclosed as illustrative forms of implementing the subject matter described in the disclosure.

What is claimed is:

1. A method comprising:
   detecting a write rate of a first virtual machine operations log in memory on a first server;
   receiving, at the first server, a write rate of a second virtual machine operations log on a second server;
   obtaining a destination write rate based on a destination coefficient associated with delay of writing data to the second server and the write rate of the second virtual machine operations log;
   determining whether the write rate of the first virtual machine operations log is greater than the destination write rate;
   if the write rate of the first virtual machine operations log is greater than the destination write rate, reducing the write rate of the first virtual machine operations log to a value less than the destination write rate combined with a slowdown coefficient; and performing at least one of replicating or migrating the virtual machine operations log from the first server to the second server based at least on the reduced write rate of the first virtual machine operations log on the first server.

2. The method of claim 1, wherein the write rate of the first virtual machine operations log on the first server is based at least on a total number of bytes stored in memory on the first server over a predetermined time interval.

3. The method of claim 1, wherein the write rate of the second virtual machine operations log from the second server is based at least on a total number of bytes stored in memory on the second server over a predetermined time interval.

4. The method of claim 1, wherein
the slowdown coefficient is less than the destination coefficient.

5. The method of claim 1, further comprising:
determining the write rate of the first virtual machine operations log on the first server is less than the write rate of the second virtual machine log on the second server by a predetermined amount; and
when the write rate of the first virtual machine operations log on the first server is less than the write rate of the second virtual machine operations log on the second server by the predetermined amount, increasing the write rate of the first server to an amount less than the write rate of the second server.

6. The method of claim 1, wherein the memory is a virtual memory on the first server.

7. The method of claim 1, wherein determining the write rate of the first virtual machine operations log on the first server is greater than the destination write rate is performed by a processor on the first server.

8. A system comprising:
memory;
a virtual machine that writes an operations log of operations performed by the virtual machine to the memory;
a processor that provides the operations log to a server that is separate from the system;
a component that detects a write rate of the operations log to the memory and receives a write rate of the operations log on the server from the server;
a component that obtains a destination write rate based on a destination coefficient associated with delay of writing data to the second server and the write rate of the second virtual machine operations log;
a comparison component that determines the write rate of the operations log to the memory is less than the destination write rate;
a rate reduction component that reduces the write rate of the operations log to the memory to a value less that the destination write rate combined with a slowdown coefficient, if the comparison component determines the write rate of the operations log to the memory is greater than the destination write rate; and
a migration component that performs at least one of replicating or migrating the operations log to the server based at least on the reduced write rate.

9. The system of claim 8, wherein the write rate of the operations log on the system is based at least on a total number of bytes being stored in memory on the system over a predetermined time interval.

10. The system of claim 8, wherein the write rate of the virtual machine operations log from the server is based at least on a total number of bytes being stored in memory on the server over a predetermined time interval.

11. The system of claim 8, wherein the slowdown coefficient being less than the destination coefficient.

12. The system of claim 8, wherein the comparison component determines the write rate of the first virtual machine operations log on the first server is less than the write rate of the second virtual machine log on the second server by a predetermined amount,
the system further comprising a rate component that increases the write rate of the first server to an amount less than the write rate of the second server, when the comparison component determines that the write rate of the operations log to the memory is less than the write rate of the second virtual machine operations log on the second server by the predetermined amount.

13. A computing apparatus comprising:
a processor; and
a memory device to store computer executable instructions, that when executed by the processor, perform acts comprising:
detecting a write rate of a virtual machine operations log in memory on a first server;
providing a first portion of the virtual machine operations log to a second server;
receiving, at the first server, a write rate of the portion of the virtual machine operations log on the second server;
obtaining a destination write rate based on a destination coefficient associated with delay of writing data to the second server and the write rate of the second virtual machine operations log;
determining the write rate of the virtual machine operations log on the first server is greater than the destination write rate;
if the write rate of the virtual machine operations log on the first server is greater than the destination write rate, reducing the write rate of the virtual machine operations log on the first server to a value less than the destination write rate combined with a slowdown coefficient; and
providing a second portion of the virtual machine operations log to the second server after waiting a predetermined period of time since providing the first portion of the virtual machine operations log.

14. The computing apparatus of claim 13, wherein the write rate of the virtual machine operations log on the first server is based at least on a total number of bytes being stored in memory on the first server during a predetermined time interval.

15. The computing apparatus of claim 13, wherein the write rate of the virtual machine operations log from the second server is based at least on a total number of bytes being stored in memory on the second server over an amount of time for the first server to send the bytes, the second server to receive the bytes and write the bytes in memory on the second server.

16. The computing apparatus of claim 13, further comprising:
determining the write rate of the virtual machine operations log on the first server is less than the write rate of the virtual machine operations log on the second server by a predetermined amount; and
if the write rate of the virtual machine operations log on the first server is less than the write rate of the virtual machine operations log on the second server by the predetermined amount, increasing the write rate of the first server to an amount less than the write rate of the second server.

17. The computing apparatus of claim 13, further comprising providing a third portion of the virtual machine operations log to the second server after waiting the predetermined period of time since providing the second portion of the virtual machine operations log.

* * * * *